(12) United States Patent
Choban et al.

(10) Patent No.: US 7,273,541 B2
(45) Date of Patent: Sep. 25, 2007

(54) MICROFLUID DEVICE AND SYNTHETIC METHODS

(75) Inventors: Eric R. Choban, Clinton, IA (US); Piotr Waszczuk, St. Paul, MN (US); Paul J. A. Kenis, Champaign, IL (US); Theodore Tzedakis, Toulouse (FR); Seong Kee Yoon, Urbana, IL (US); Cheikhou Kane, Toulouse (FR)

(73) Assignee: The Board of Trustees of the University of Illinois, Urbana, IL (US)

( * ) Notice: Subject to any disclaimer, the term of this patent is extended or adjusted under 35 U.S.C. 154(b) by 377 days.

(21) Appl. No.: 10/844,058

(22) Filed: May 11, 2004

(65) Prior Publication Data

US 2005/0252784 A1 Nov. 17, 2005

(51) Int. Cl.
C25B 3/00 (2006.01)
C25B 1/00 (2006.01)
C25B 9/00 (2006.01)
G01N 27/26 (2006.01)

(52) U.S. Cl. .................. 205/413; 205/345; 204/242; 204/403.03

(58) Field of Classification Search ................ 205/413, 205/345; 204/403.03, 242
See application file for complete search history.

(56) References Cited

U.S. PATENT DOCUMENTS

| | | | |
|---|---|---|---|
| 6,607,655 B1 | 8/2003 | Lowe et al. | |
| 6,713,206 B2 | 3/2004 | Markoski et al. | |
| 2001/0033958 A1 | 10/2001 | Marchetti | |
| 2002/0108852 A1 | 8/2002 | Merk et al. | |
| 2003/0124509 A1 | 7/2003 | Kenis et al. | |
| 2003/0134163 A1 | 7/2003 | Markoski | |

OTHER PUBLICATIONS

Arnold, F., "Combinatorial and Computational Challenges for Biocatalyst Design", Nature, vol. 409, pp. 253-257, (2001).
Bergel, A., et al., "Thin Layer Spectroelectrochemical Study of the Reversible Reaction Between Nicotinamide Adenine Dinucleotide and Flavin Adenine Dinucleotide," Journal of Electroanalytical Chemistry, vol. 302, pp. 219-231, (1991).
Chenault, H.K., et al., "Regeneration of Nicotinamide Cofactors for Use in Organic Synthesis," Applied Biochemistry and Biotechnology, vol. 14, pp. 147-194, (1987).
Devaux-Basseguy, R., et al., "Potential Applications of NAD(P)-Dependent Oxidoreductases in Synthesis: A Survey," Enzyme Microb. Technol., vol. 20, pp. 248-258, (1997).
Ferrigno, R., et al., "Membraneless Vanadium Redox Fuel Cell Using Laminar Flow," J. Am. Chem. Soc., vol. 124, pp. 12930-12931, (2002) with corrections.
K.M. Koeller, et al., "Enzymes for Chemical Synthesis," Nature, vol. 409, pp. 232-240, (2001).
Kenis, P.J., et al., "Microfabrication Inside Capillaries Using Multiphase Laminar Flow Patterning," Science, vol. 285, pp. 83-85, (1999).
Khosla, C., et al., "Modular Enzymes", Nature, vol. 409, pp. 247-252, (2001).
Klibanov, A., "Improving Enzymes By Using Them In Organic Solvents", Nature, vol. 409, pp. 241-246, (2001).
Schmid, A., et al., "Industrial Biocatalysis Today and Tomorrow," Nature, vol. 409, pp. 258-268, (2001).
Skoog, D.A., et al., "Fundamentals of Analytical Checmistry", 4th ed., p. 306, CBS College Publishing (1982).
Walsh, C., "Enabling the Chemistry of Life", Nature, vol. 409, pp. 226-231, (2001).
Wichmann, R., et al., "Continuous Enzymatic Transformation in an Enzyme Membrane Reactor with Simultaneous NAD(H) Regeneration," Biotechnology and Bioengineering, vol. 23, pp. 2789-2802, (1981).
Zhao, H., et al., "Directed Evolution of Enzymes and Pathways for Industrial Biocatalysis," Current Opinion in Biotechnology, vol. 13, pp. 104-110, (2002).
Zhao, H., et al., "Regeneration of Cofactors for Use in Biocatalysis," Current Opinion in Biotechnology, vol. 14, pp. 583-589, (2003).
Allen, P.M., et al., "Electrochemical regeneration of redox cofactors and mediators—the key to bioelectrosynthesis", Trends in Biotechnology, vol. 3, No. 6, pp. 145-149, (1985).
Choban, E.R., et al., "Microfluidic fuel cell based on laminar flow", Journal of Power Sources, vol. 128, pp. 54-60. (2004).
International Search Report dated Feb. 22, 2007 for PCT application No. PCT/US2005/016538.
Yoon, S.K., et al., "Laminar flow based microreactor for regeneration of NADH", Abs. 732, 205th meeting May 9-13, 2004, The Electrochemical Society, Abstract 1 page, (2004).

*Primary Examiner*—Maryam Monshipouri
(74) *Attorney, Agent, or Firm*—Evan Law Group LLC

(57) ABSTRACT

A method of electrolytic synthesis comprises applying a potential between a first electrode and a second electrode. The first electrode is in contact with a first fluid stream in a channel, the second electrode is in contact with a second fluid stream in the channel, and the first steam and the second stream are in parallel laminar flow in the channel.

16 Claims, 4 Drawing Sheets

MICROFLUID DEVICE AND SYNTHETIC METHODS

BACKGROUND

The activity of biological molecules is often greatly influenced by the presence of one or more asymmetric centers. For example, R-asparagine is a sweetener, while the S enantiomer tastes acidic; S-S ethanbutol is a tuberculostatic drug, yet the R-R form causes blindness. Typical organic syntheses yield racemic mixtures, which often require a cumbersome separation to obtain the desired enantiomer. So, for the synthesis of pharmaceuticals, fragrances, sweeteners, etc., direct stereoselective syntheses yielding only the desired chiral configurations are highly preferred over non-stereoselective routes requiring separation of racemic mixtures.

Nicotinamide adenine dinucleotide (NAD) and nicotinamide adenine dinucleotide phosphate (NADP) (collectively referred to as NAD(P), NAD(P)$^+$ in the oxidized form, and NAD(P)H in the reduced form) serve as cofactors in many enzyme catalyzed oxidation-reduction reactions. A broad range of applications for NAD-dependant enzyme reaction exists, particularly using dehydrogenases: production of amino acids by reductive amination of $\alpha$-keto carboxylic acids (L-leucine, L-alanine, L-vanilline, etc.); production of hydroxy-acids (for example, the conversion of pyruvate into L-lactate, and production of $\alpha$-ketobutyrate into L-hydroxy acid); reduction of aldehydes and ketones; synthesis of alcohols that have applications in perfumes and food additives; selective hydroxylation and dehydrogenation of steroids (via hydroxylation of progesterone, and dehydrogenation of an intermediate in the synthesis of chenodeoxycholic acid, a gallstone drug); and a variety of environmental processes involving carbon dioxide transformation. Dehydrogenase-catalyzed syntheses would thus become interesting from an economic view point if the required NADH (and NADPH) cofactor was commonly available, or could be continuously regenerated from NAD$^+$ (or NADP$^+$) (see, for example, R. Devaux-Basseguy, A. Bergel, M. Comtat, Potential Applications of NAD(P)-dependent oxidoreductases in synthesis: a survey, Enzyme Microb. Technol., 1997, 20, 248-258).

Chemical, photo-chemical, enzymatic, biologic and electro-chemical methods to regenerate NADH and NADPH have been studied extensively (see, for example, H. K. Chenault, G. M. Whitesides, Regeneration of Nicotinamide Cofactors for use in Organic Synthesis, Applied Biochemistry and Biotechnology, 14,147-194 (1987)). From an electro-chemical point of view, one can regenerate NADH directly or indirectly. Direct conversion of NAD$^+$ into the active NADH at the electrode (FIG. 1A) is difficult: intermediate radicals dimerize and various inactive isomers are formed. These problems can be overcome, but not without significant extra effort, including functionalization of NAD by precise pretreatment of the electrodes, or by using additional hydrogenase enzymes. In the indirect regeneration of NADH from NAD$^+$, a mediator accepts electrons from the electrode and provides these to an enzyme that regenerates NADH from NAD$^+$ (FIG. 1B).

Use of flavin adenine dinucleotide (FAD) as the mediator has been proposed because of its stability in electrochemical cycles. However, the oxidation of the desired NADH species by the FAD mediator is spontaneous at pH 7.0 without involvement of an enzyme:

$$NADH+FAD+H^+ \rightleftharpoons NAD^++FADH_2 \Delta G'^\circ=-20.3 \text{ kJ/mol} \quad (1)$$

In classical batch reactors, FADH$_2$ is not sufficiently stable and its concentration is never great enough in solution to shift the equilibrium in the reverse direction to generate NADH. Bergel et al. showed that shifting the equilibrium to favor the reverse reaction using a thin layer electrochemical cell is possible, yet difficult (A. Bergel and M. Comtat, "Thin-layer spectroelectrochemical study of the reversible reaction between nicotinamide adenine dinucleotide and flavin adenine dinucloeotide," Journal of Electroanalytical Chemistry, vol. 302, 219-231 (1991)). Although this thin layer cell works well for analytical purposes, using this small, non-flowing design for production would be difficult, if not impossible.

Laminar flow electrochemical synthesis has been described (U.S. Pat. No. 6,607,655). This cell includes two parallel electrodes placed in close proximity (typically 0.25-1 mm) where a single stream of reactants is passed between the electrodes.

Patents involving microfluidic systems or methods involving laminar flow are also known. Published patent application 20030124509 offers a comprehensive overview of microfluidic devices in chemical systems; electrochemical systems are not described. U.S. Pat. No. 6,713,206 describes a galvanic electrochemical cell including multi-stream laminar flow. Graphite plates as current collectors have also been described (for example, published patent application 20010033958).

BRIEF SUMMARY

In a first aspect, the present invention is a method of electrolytic synthesis, comprising applying a potential between a first electrode and a second electrode. The first electrode is in contact with a first fluid stream in a channel, the second electrode is in contact with a second fluid stream in the channel, and the first steam and the second stream are in parallel laminar flow in the channel.

In a second aspect, the present invention is a method of reducing a redox enzyme cofactor, comprising applying a potential between a first electrode and a second electrode. The first electrode is in contact with a first fluid stream in a channel, the second electrode is in contact with a second fluid stream in the channel, the first steam and the second stream are in parallel laminar flow in the channel, the channel has a width of at most 1 mm, and an enzyme is present in the channel.

In a third aspect, the present invention is an electrolytic cell, comprising a first electrode, a second electrode, a power supply, electrically connected to the first electrode and the second electrode, and a channel contiguous with at least a portion of the first and the second electrodes. When a first fluid and a second fluid flow through the channel parallel laminar flow is established between the first and second fluids, and the first fluid is in contact with the first electrode and the second fluid is in contact with the second electrode.

In a fourth aspect, the present invention is an array of electrolytic cells, comprising a plurality of electrolytic cell, each comprising a first electrode, a second electrode, a channel contiguous with at least a portion of the first and the second electrodes. When a first fluid and a second fluid flow through the channel parallel laminar flow is established between the first and second fluids, and the first fluid is in contact with the first electrode and the second fluid is in contact with the second electrode. A power supply is electrically connected to each first electrode and each second electrode.

In a fifth aspect, the present invention is an electrolytic cell, comprising a first electrode, a second electrode, a channel contiguous with at least a portion of the first and the second electrodes, and an enzyme, in the channel. When a first fluid and a second fluid flow through the channel parallel laminar flow is established between the first and second fluids, and the first fluid is in contact with the first electrode and the second fluid is in contact with the second electrode.

Definitions

A redox enzyme cofactor is a cofactor of an enzyme that is either reduced or oxidized during reaction with the enzyme. Preferably the redox enzyme cofactor is an organic compound, such as NADH, $NAD^+$, NADPH, $NADP^+$, and metalloporphyrins.

Electrochemical cells are classified as galvanic if they produce electrical energy (such as a fuel cell or battery), and as electrolytic if their operation requires electrical energy from an external source (D. A. Skoog and D. M. West, "FUNDAMENTALS OF ANALYTICAL CHEMISTRY", $4^{th}$ ed., p. 306, CBS College Publishing (1982)).

A working stream is a stream of fluid that is in contact with the working electrode. Similarly, a counter stream is a stream of fluid that is in contact with the counter electrode.

Electrolytic synthesis is the synthesis of compound by the application of an electric potential.

DETAILED DESCRIPTION

Figure 1:
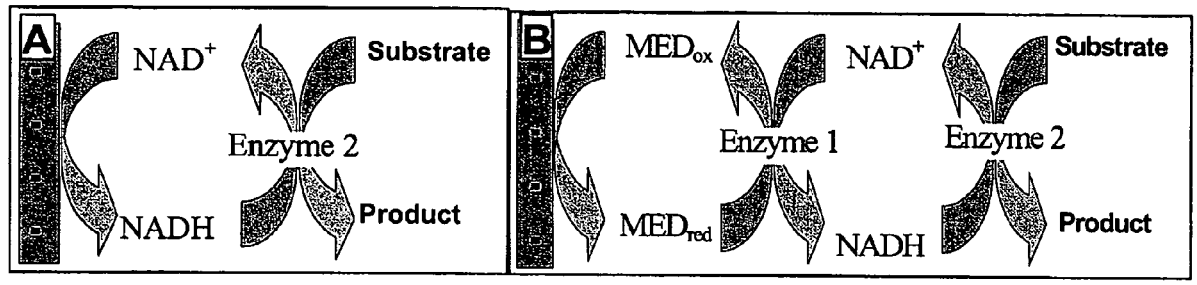
FIG. 1A illustrates an electrochemical reaction for the reduction of the $NAD^+$ to NADH directly.
FIG. 1B illustrates an electrochemical reaction for the reduction of the $NAD^+$ to NADH indirectly.

The present invention makes use of the discovery that electrolytic multistream parallel laminar flow systems for synthesis can shift the ΔG of reactions by as much as two orders of magnitude, allowing for the electrochemical synthesis of compounds that otherwise can only be made in very low yields. In these parallel laminar flow systems, the channel width is very small (typically 500 µm or less), so therefore the distance between the working and counter electrodes is also very small. This, together with the fact that there is no ion permeable membrane (such as polymer electrolyte membrane or salt bridge) between the two electrodes, keeps the cell resistance very low. The width of the stream of liquid adjacent the working electrode (referred to as the working stream) is even smaller (typically 80 µm or less), which results in the concentration of species produced at the working electrode to be very high within the working stream. Furthermore, the flow of the fluid within the channel sweeps away products of the electrochemical reaction, greatly reducing the effective concentration of the reaction products; by LeChatelier's principal, the production of the products will be greatly enhanced. Finally, because the systems use fluid flow, rather than batch reaction, continuous production of products is possible, allowing for in situ regeneration of reactants as they are consumed, or the continuous production of products. This system is particularly useful for the generation and regeneration of redox enzyme cofactors, including NADH and NADPH.

The system presented here also allows for isolation of electrodes in specific media while still maintaining the electrodes in conductive contact through the fluid or fluids flowing through the channel, in laminar flow. The laminar flow prevents mixing of the fluids (for example, the working stream and the counter stream), yet because the two fluids are in contact, ions may travel between them. This also allows for direct control over the physiochemical phenomena (e.g. chemical reactions) occurring at the electrodes. The multistream laminar flow electrochemical cell (also referred to as a microreactor) design is an excellent system for electrochemical synthesis, for example of chiral organic molecules that are the starting materials for many pharmaceuticals. The large surface area to volume ratio in the electrochemical cell also has the potential to result in more efficient conversion of species due to a large catalyst surface area when compared to the sample size. Also, in a preferred embodiment using graphite plates within a multistream laminar flow electrochemical cell enables electrochemical synthetic pathways that are unfavorable or impossible at the macroscale such as the conversion of NADH from $NAD^+$.

The electrolytic cell includes a first electrode (for example, a working electrode) and a second electrode (for example, a counter electrode), and a channel contiguous with at least a portion of the first and second electrodes. The channel has at least two inlets and at least one outlet; three, four or more inlets are possible, for the inclusion of additional streams of fluid; similarly, two, three, four or more outlets are possible. Additional electrodes may also be present, for example multiple working electrodes, multiple counter electrodes, and one or more reference electrodes.

The inlets may meet at almost any angle, for example head-on (forming a "T" shape, with the channel forming the vertical part of the "T"), or at an angle (forming a "Y" shape, with the channel forming the vertical part of the "Y"). With more than two inlets, the angle formed with the channel by each inlet may be the same or different. The inlets may intersect the channel at different points along the length of the channel, and at different locations around the channel. Furthermore, the diameter of the inlets may be the same or different, and the path of each inlet may be straight, curved, or multiply curved (such as a spiral or squiggle); again each inlet may be the same or different. Similarly, the channel itself may be straight, curved, or multiply curved. In addition, the channel, as well as the inlets and outlet or outlets, may have any cross sectional shape (such as a circular, oval, square, rectangle, etc.).

The electrodes may make contact (i.e. be contiguous with) any portion of the channel, or the full length of the channel. Preferably, a reference electrode is present, and may be present in the channel, by an outlet or inlet of the channel, or anywhere that it would be in contact with fluid as it flows into or out of the channel.

An indicator of the flow regime for a fluid can be expressed as a dimensionless quantity known as the Reynolds number ($R_e$). The Reynolds number is defined as the ratio of inertial forces to viscous forces, and can be expressed as:

$$Re = \rho v D_{eq}/\mu$$

where $D_{eq}$ is the equivalent diameter, $\rho$ is the density of the fluid in grams/cm$^3$, v is the linear velocity in meters/sec., and $\mu$ is the viscosity of the fluid in grams/(sec.)(cm). There is a transitional critical value of $R_e$ for any given. geometry above which flow is said to be turbulent and below which flow is said to be laminar. For typical fluidic devices, the transition from laminar to turbulent flow has been empirically determined to occur around $R_e$=2100. Formulae to calculate Re for specific geometries are well known (see: G. T. A. Kovacs "MICROMACHINED TRANSDUCERS: SOURCEBOOK" McGraw-Hill, Boston (1998)).

The flow of fluid through the channel may be controlled by the volumetric flow rate of the streams of fluid flowing into the inlets. The volumetric flow rate of the streams may be controlled independently, and thereby the relative size (or width) of the streams (such as the working stream in contact with the working electrode, and the counter stream in contact with the counter electrode) may be controlled. In this way, the channel may be much larger (preferably having a width at most 1 mm, more preferably 10 microns to 750 microns, most preferably 100 to 500 microns) than the working stream (which, for example, may have a width of 80 microns). Controlling the relative size of the streams can be used to control the efficiency of chemical synthesis within the channel: A larger working stream will allow more starting materials to come into contact with the working electrode, while a smaller working stream will increase the effective concentration of species produced at the working electrode. The fluids flowing into the inlets, such as the working stream and the counter stream, may be aqueous, non-aqueous, miscible with each other or immiscible.

The synthesis of compounds may be direct or indirect. For example $FADH_2$ may be synthesized directly from FAD at the working electrode, by reduction (see Rxn. 2, below). In contrast, $NAD^+$ may be synthesized indirectly, by direct reduction of FAD to $FADH_2$ (as a mediator) at the working electrode, and then $FADH_2$ reduction of $NAD^+$ to NADH, catalyzed by formate dehydrogenase (FDH). Using these chemical reactions, the electrolytic cell may be used to synthesize NADH or NADPH (or any other redox enzyme cofactor using different enzymes) or to regenerate NADH or NADPH from $NAD^+$ or $NADP^+$ (or any other redox enzyme cofactor using different enzymes) as they are consumed by enzyme catalyzed reactions, during the synthesis of other compounds. The table below lists a variety of biochemical compounds that may be synthesized in the electrolytic cell (for example, indirectly by reduction with NADH, NADPH, or $FADH_2$ or by oxidation with $NAD^+$, $NADP^+$ or FAD).

Biochemical Redox Couples

Dichlorophenolindophenol$_{(ox)}$/DCPI P$_{(red)}$
Phenazine methosulfate$_{(ox)}$/PMS$_{(red)}$
Dehydroascorbate/ascorbate
Phenazine ethosulfate$_{(ox)}$/PES$_{(red)}$
Fumarate/succinate
Methylene blue$_{(ox)}$/MB$_{(red)}$
Glyoxylate/glycolate
Oxaloacetate, $NH_4^+$/aspartate
Pyruvate, $NH_4^+$/alanine
2-Oxoglutarate, $NH_4^+$/glutamate
Hydroxypyruvate/glycerate
Oxaloacetate/malate
Pyruvate/lactate
Dihydroxyacetonephosphate/glycerol-1-phosphate
Acetaldehyde/ethanol
FMN/FMNH$_2$
FAD/FADH$_2$
3-Hydroxy-2-butanone/2,3-butanediol
Fructose/sorbitol
Acetone/2-propanol
1,3-Diphosphoglycerate/3-phospho-glyceraldehyde, P$_i$
Lipoamid$_{(ox)}$/lipoamide$_{(red)}$
Lipoate$_{(ox)}$/lipoate$_{(red)}$
Pyruvate, $CO_2$/malate
Glutathione$_{(ox)}$/glutathione$_{(red)}$
Cystine/cysteine
Acetoacetate/3-hydroxybutyrate
2-Oxoglutarate, $CO_2$/isocitrate
$CO_2$/formate
6-Phosphogluconate/glucose-6-phosphate
Gluconate/glucose
Oxalate/glyoxylate
3-Phosphoglycerate/3-phosphoglyceraldehyde
Methyl viologen$_{(ox)}$/MV$_{(red)}$
Acetate/acetaldehyde
Succinate, $CO_2$/2-oxoglutarate
Acetate, $CO_2$/pyruvate One or more catalysts, including enzymes, may be present in the electrolytic cell. The catalysts may be physically attached to the working electrode, or the surface of the channel. Alternatively, the catalyst may be fixed within the channel, by being attached to beads, particles, a hydrogel, or a polymer mesh present within the channel. Catalysts may also be present in the fluid or fluids present in the channel; in this case, it is preferable to recycle the catalyst back into the fluids flowing through the channel.

Figure 2:
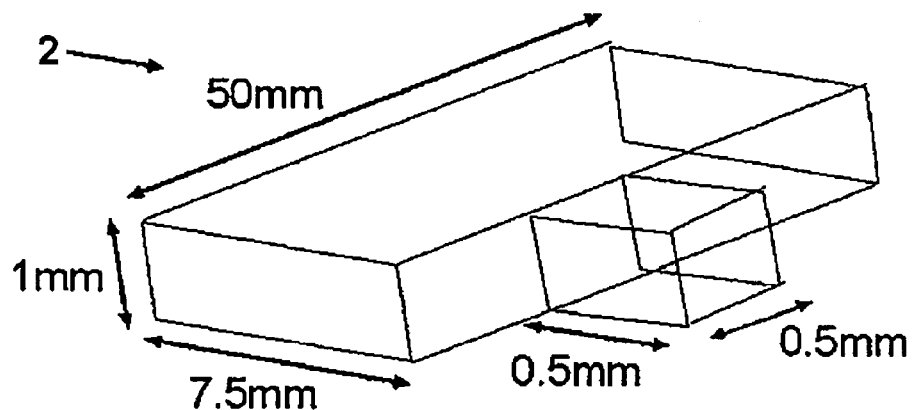
FIG. 2 illustrates the details of a separator.
Figure 3:
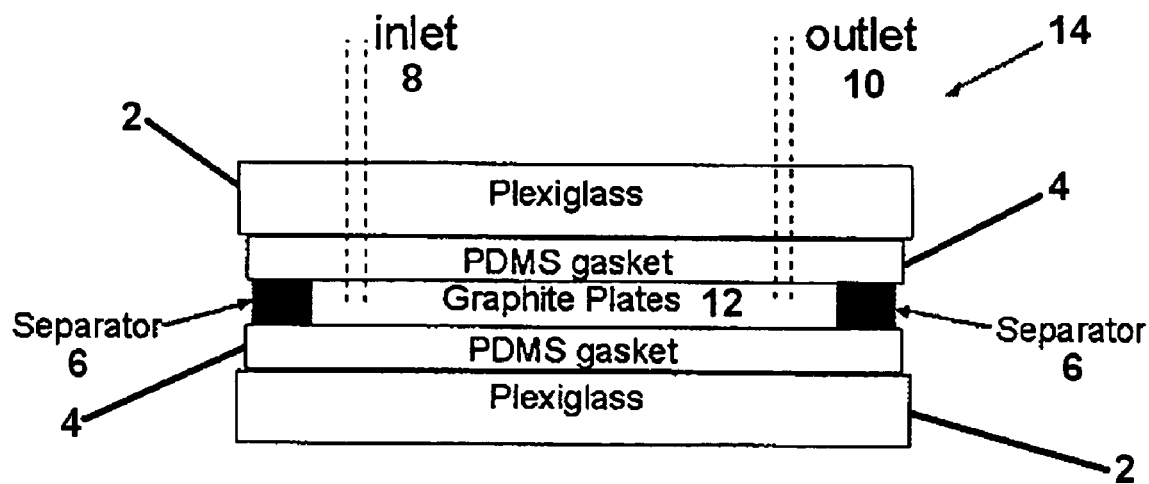
FIG. 3 is a schematic views of a layered assembly of an electrolytic cell, side view.
Figure 4:
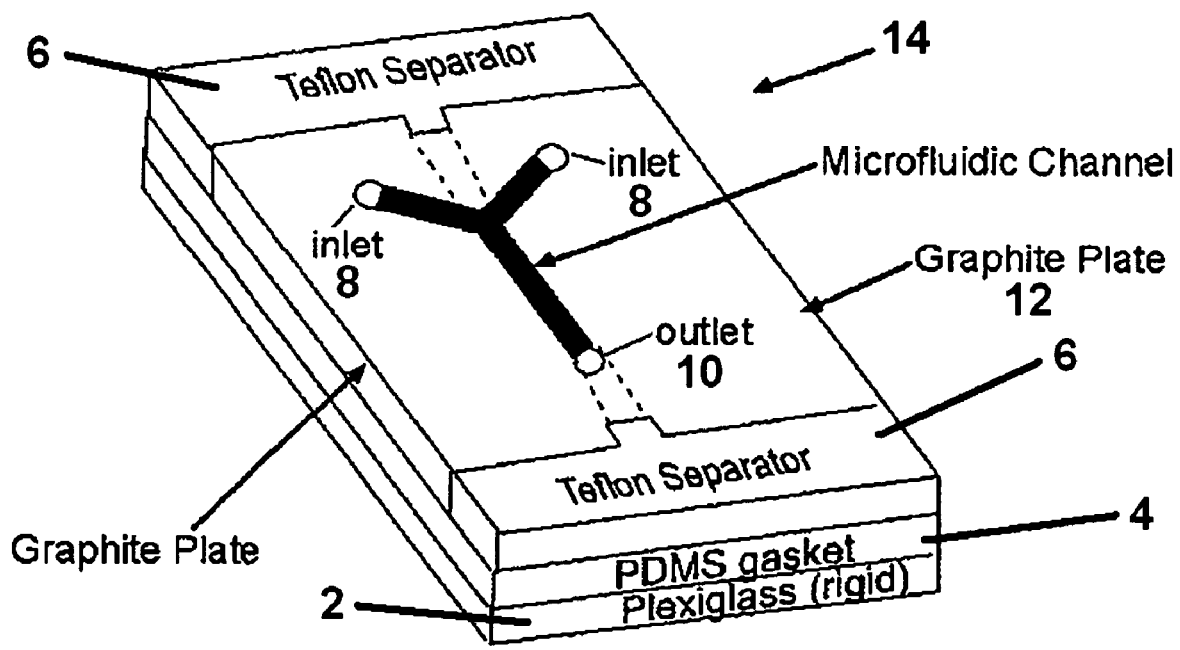
FIG. 4 is a schematic views of a layered assembly of an electrolytic cell, top view, with the top half of the cell removed to show internal detail.

FIGS. 3 and 4 exemplify an embodiment of the present invention. Although specific materials are specified in the figures, other materials with similar properties may also be used. There are four parts in the design shown of the cell 14 in FIGS. 3 and 4: a support structure 12 that is clamped between two elastic slabs 4 and a rigid top and bottom support layer 2, together with an external reference electrode (not shown) that is placed close to the working electrode. The clamping may be with a large clip, top and bottom plates held together by adjustable screws, or with heat sealable plastics or polymers. The elastic slabs may be made from any elastic material, such as that used in O-rings and gaskets. Since the goal with clamping is to prevent leakage, these parts may also be held together by a glue or sealant, avoiding the need for either or both the clamping and the elastic slabs. A separator 6 may be included to keep the electrodes (support structures 12) separated. The separators may be made from any insulating material. Preferably, graphite plates are used as the support structure of the microfluidic cell where the thickness and spacing of the graphite plates when assembled define the dimensions of the microfluidic channels with inlets 8 and outlet 10 that form the cell structure. Any conductive material may be used as the support structure, if they are to function as electrodes. Alternatively, an insulating support structure may be used, but then a conductive layer must be included on the portions defining at least a portion of the microfluidic channel, which will then be the electrodes of the cell. Such conductive layers may be formed by evaporation (such as the evaporation of gold), or by sputtering. They also serve as the substrate for catalysts, such as a nanoparticle-based catalyst, if needed. The details of the separator are illustrated in FIG. 2.

Figure 7:
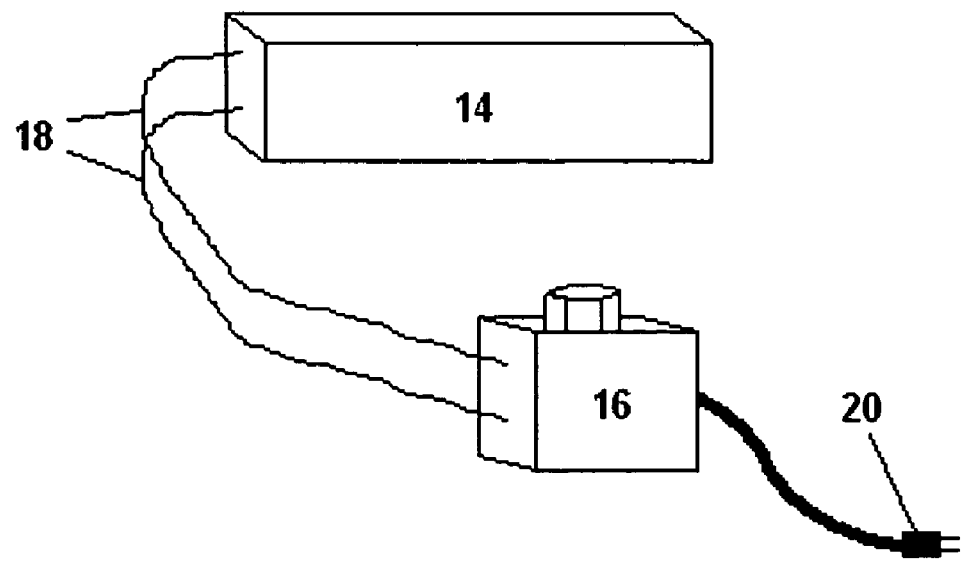
FIG. 7 illustrates a cell including a power supply.

The cell is an electrolytic cell, and therefore during operation requires electrical energy from an external source. This may be provided by a power supply (which regulates the power to the cell; preferably the power supply is a DC power supply). FIG. 7 illustrates a cell 14 including a power supply 16 electrically connected to the cell via wires 18; the power supply may be connected to wall current via plug 20. The power supply is preferably electrically connected to the working and counter electrodes. The power supply may be included with the cell (for example, a DC power supply which includes a plug for connecting to a standard wall socket, either a two prong plug or a three prong plug), or may be external (when external, preferably the cell contains an electrical connector for connecting to a power supply).

Figure 8:
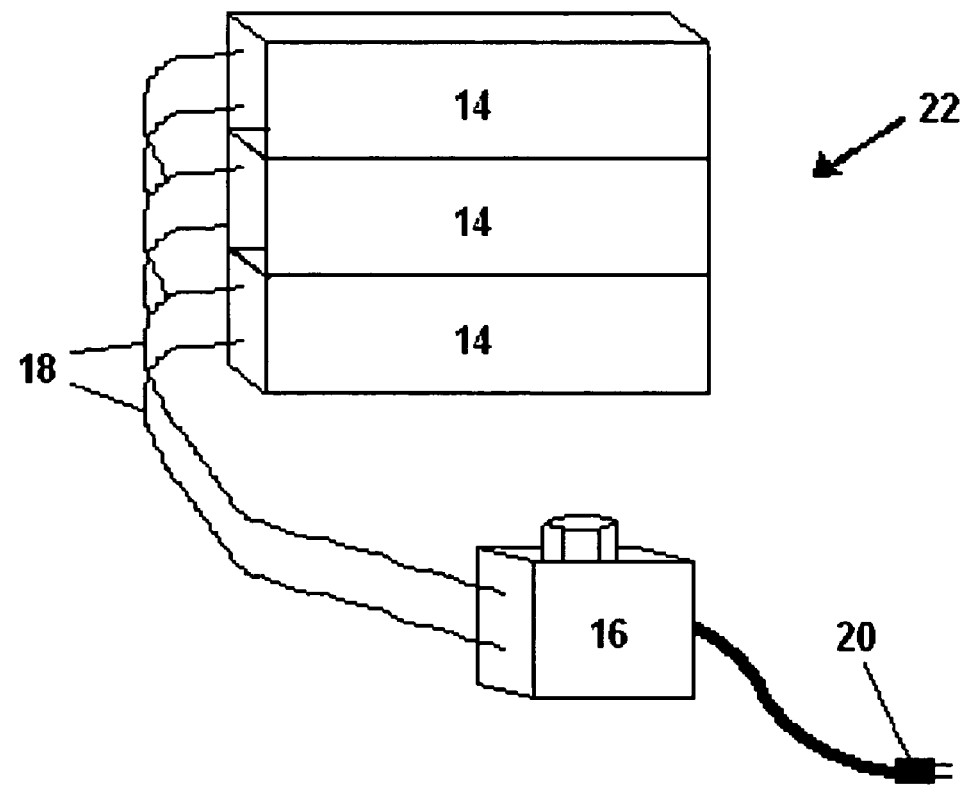
FIG. 8 illustrates an array of cells.

FIG. 8 illustrates an array of cells 22, containing a plurality of cells 14, which may be used to increase the total amount of product producible with this system; here the cells are connected in parallel via wires 18 to a single power supply 16 which has a plug 20. The cells may share a common power supply or each may have their own power supply. The electrical connection from a single power supply to each cell may be in parallel, or in series.

In these electrochemical cells, catalyst, if needed, is applied to the working electrode to form the active electrode area of the electrochemical cell. In some cases the catalyst is applied to the working electrode before insertion into the electrochemical cell. The graphite plates may be employed to serve the combined purposes of catalyst support, current collector, and the material that defines the geometry and dimensions of the channel structure through which the reactants flow.

EXAMPLE

Multistream laminar flow-assisted focusing of the reactants on the cathode allows for $FADH_2$ to be produced in sufficient amounts at the electrode (Rxn. 2) to enable the regeneration of the NADH cofactor from $NAD^+$ as catalyzed by formate dehydrogenase (FDH) in solution (Rxn. 3):

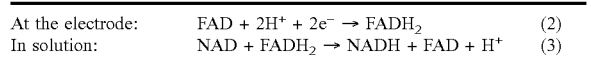

| At the electrode: | $FAD + 2H^+ + 2e^- \rightarrow FADH_2$ | (2) |
| In solution: | $NAD + FADH_2 \rightarrow NADH + FAD + H^+$ | (3) |

The latter reaction has been intensively studied because of its great importance in a wide variety of applications for synthesis of compounds of interest in society. In contrast to the thin layer cell studied previously, the microreactor allows for continuous, flowing operation. This technology is thus capable of performing selective enzymatic reactions by modification of the reaction outcome through the use of a multistream laminar flow reactor.

An electrochemical cell for laminar flow-based electrochemistry experiments was fabricated. The graphite plates serve as central support structures carrying the outlines of the fluidic channels (i.e. defining the geometry/dimensions of the fluidic channels). The electrochemical cell has the working and counter electrodes in a face-to-face orientation as shown in FIGS. 3 and 4. Using a fabrication scheme that involves spacing and sealing the two graphite plates as discussed in this section, the face-to-face orientation of the working and counter electrodes as shown was obtained.

Carbon plates (EDM SUPPLIES INC., poco grade EDM-3, 0.0001 inch particle size, 1 mm thickness), are referred to as graphite plates. Other materials including silicone elastomers (PDMS or SILGARD 184, Dow Corning), multicomponent epoxy resins, as well as other materials, may be used as well.

The inlet channels were milled out of the graphite pieces at desired dimensions. Shaving the graphite blocks to the desired dimensions can be used to control the thickness. The channel structure was obtained via spacing the two pieces containing the inlet channels at a specific distance and then joining them by a nonconductive adhesive. This results in a freestanding central support structure (0.5-3 mm in thickness) carrying the outlines (sidewalls) of the Y-shaped microfluidic channel system.

The graphite plates serve as the support for the catalyst deposition. Here. deposition of nanoparticles was used. The graphite is conductive with a low ohmic resistance, around 1 ohm in the illustrated configuration, and therefore acts as a current collector.

Where the electrochemical reaction requires catalyst, the catalyst on the anode may be a nanoparticle based catalyst, such as unsupported Pt/Ru 50:50 atomic weight percent nanoparticles (stock # 41171 lot # K28K14 ALFA AESAR, a Johnson Matthey Company) in 10% NAFION solution (DUPONT PERFLUOROSULFONIC ACID PRODUCTS 5% SOLUTION). All experiments were performed at room temperature unless otherwise stated. All these experiments can also be performed at higher temperatures, for example up to 80° C.

An oxidant solution that had been deoxygenated was obtained by bubbling nitrogen (99.99%, S. J. Smith Welding Supply) through an aqueous solution for at least 15 minutes. A glass tube ending in a glass frit was used to create very fine bubbles.

The electrochemical cell design used here is described in FIGS. 3 and 4 with the following exceptions: no catalyst was used; the electrodes include gold seed layers on a polycarbonate support structure, and the channel width was reduced to 0.5 mm; a molybdenum wire was used as the reference electrode, and was placed in the cathode stream near the inlet of the Y-junction. The range of concentrations for all reagents was 1 to 10 mM and all solutions were bubbled with nitrogen to remove oxygen prior to use. The cathode stream contains enzyme (FDH), FAD, and $NAD^+$ in a phosphate buffer (pH=7.0); and the anode stream contains phosphate buffer only.

Characterization Using Cyclic Voltammetry

Figure 5A:
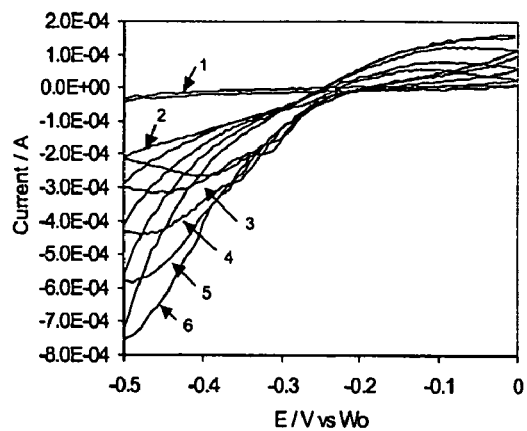
FIGS. 5A and 5B are graphs of scan rate dependence of cyclic voltammetry curves obtained in an electrolytic cell; anode stream: phosphate buffer pH=7.0; cathode stream: [FAD]=5 mM without (A) and with (B) 0.5 g/L FDH enzyme. Flow rate: 500 µL/min. per stream. Curve 1: residual current at 2 V/s; Scan rate of curves 2 to 6: 0.1, 0.2, 0.5, 1, and 2 V/s.
Figure 5B:
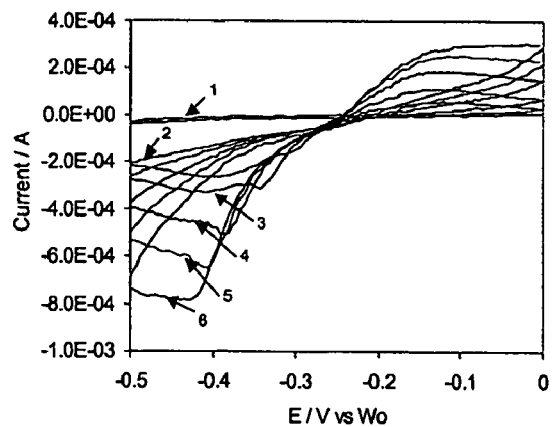

Scan rate dependence experiments (FIGS. 5A and 5B) show that the presence of FDH causes an increase in the FAD reduction current and thus demonstrates that the reactions did take place in the microreactor. Moreover, the presence of an anodic peak indicates that [FADH$_2$]>0 and therefore the operating conditions do not yet correspond with the optimum rate values of reaction. Also flow rate experiments confirm that reactions 2 and 3 indeed take place. The scan rate range (2<r<30 mV/s) and flow rate range (0.3<Qa=Qc<0.6 cm$^3$/min) used in these studies still correspond to low conversions of NAD to NADH (<10%).

Determination of Operation Point for Electrolysis

In order to have a high faradaic yield, electrolysis must be performed at a potential higher than −0.7 V vs. Mo. For constant current electrolysis, the applied current and potential must be chosen such that H$^+$ reduction is avoided. We have observed that the conversion depends highly on the volumetric flow rate with best performance below 0.3 cm$^3$/min per stream.

Regeneration of NADH

The microreactor was used in the constant current mode and by control of the potential, secondary reactions at the cathode could be avoided. The product stream was collected and the concentration of NADH and FAD were determined by measuring the absorbance at their absorbance maximum of 450 and 340 nm, respectively. Using these two values of absorbance permits determination of the concentration of any active product in the mixture. The width of the cathode stream was reduced and the conversion as a function of flow rate for a cathodic stream was measured with a width of 125 micron obtained by adjusting the channel width. The conversion to NADH seemed to increase with decreasing flow rate due to the extended residence time. When reducing the cathode stream width to 40 micron, the conversion increased from 5% to as high as 35%, while maintaining the same flow rate. As the channel width gets smaller the working stream focuses more towards the electrode and the reagents diffuse more easily through the working stream (steep depletion gradient), which results in a much higher conversion.

Figure 6:
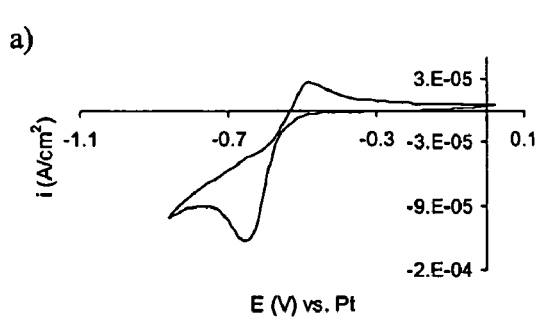
FIGS. 6A, 6B, 6C and 6D: (6A) is a cyclic voltammogram of FAD, obtained in an electrolytic cell; anodic stream: phosphate buffer pH=7.0; cathodic stream: [FAD]=5 mM; total flow rate: 100 µL/min; scan rate: 100 mV/s; flow rate ratio (FAD stream:phosphate buffer)=1:20. From the cyclic voltammetry curve, running condition (potential) for the reduction of FAD was chosen; (6B) is a UV spectra of FAD and NADH. From the wavelength of 450 nm, where NADH does not absorb, the FAD concentration is calculated and from the wavelength of 340 nm, where the peak of NADH is, the NADH concentration is calculated; (6C) is a chromatogram of the individual substrates and products obtained from HPLC. A The conversion of pyruvate to L-lactate was analyzed by HPLC on a PL Hi-Plex H ligand exchange column from Polymer Laboratories. (6D) is a chromatogram of substrates and products all in one sample after electrochemical synthesis; the peak of the pyruvate decreases and L-lactate is formed.
Figure 6:
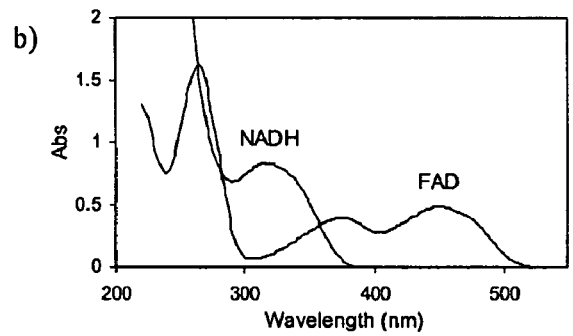
Figure 6:
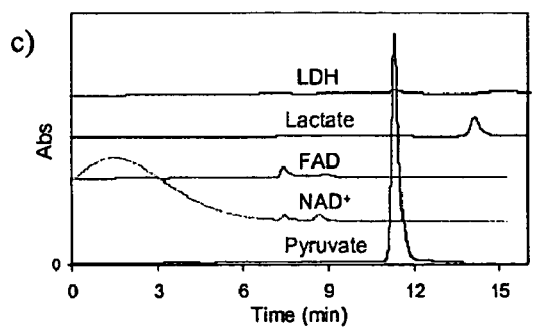
Figure 6:
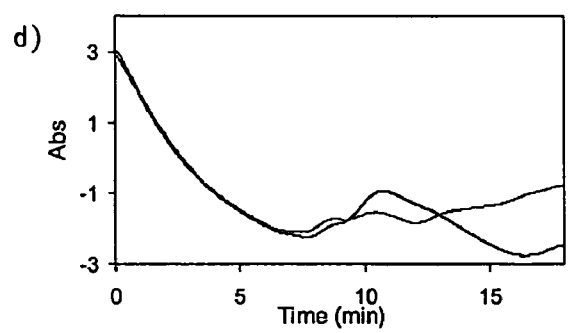

The capability of this microreactor to focus reactants close to the cathode results in the generation of FADH$_2$ in sufficient concentrations to drive Rxn. 3 which in turn generates NADH. The best conversion of 35±2% was observed under low flow conditions with the cathode stream having a 40 micron width at a diffusion limited current of flavine reduction at ~0.1 mA. In FIG. 6 we show the actual use of the regeneration of NADH from NAD for the use of generating a stereospecific synthesis of pyruvate to L-lactate.

Prophetic Example

Drinking water and wastewater often contain nitrate levels that are unacceptable. Electro-catalytic reduction to nitrogen is one option to reduce the. nitrate concentration (Rxn. 4). Precise control of variables such as channel size and flow rate in the electrolytic cell described allows for maintaining the optimum environment (for example, pH) for nitrate reduction.

$$2NO_3^- + 12H^+ + 10e^- \rightarrow N_2 + 6H_2O \qquad (4)$$

The invention claimed is:

1. A method of electrolytic synthesis, comprising:
applying a potential between a first electrode and a second electrode, to reduce flavin adenine dinucleotide to FADH$_2$;
wherein the first electrode is in contact with a first fluid stream in a channel, the second electrode is in contact with a second fluid stream in the channel, and
the first steam and the second stream are in parallel laminar flow in the channel.

2. The method of electrolytic synthesis of claim 1, wherein the channel has a width of at most 1 mm.

3. The method of claim 1, wherein a catalyst is present in the channel.

4. The method of claim 3, wherein the catalyst is fixed within the channel.

5. The method of claim 3, wherein the catalyst is an enzyme.

6. The method of claim 5, wherein the enzyme is fixed within the channel.

7. The method of claim 5, wherein the first stream comprises the enzyme.

8. The method of claim 7, further comprising:
recovering the enzyme from the first stream after the first stream exits the channel, and
returning the enzyme to the first stream.

9. A method of reducing a redox enzyme cofactor, comprising:
applying a potential between a first electrode and a second electrode, to reduce the redox enzyme cofactor;
wherein the first electrode is in contact with a first fluid stream in a channel, the second electrode is in contact with a second fluid stream in the channel,
the first stream and the second stream are in parallel laminar flow in the channel,
the channel has a width of at most 1 mm,
an enzyme is present in the channel, and
the first stream comprises flavin adenine dinucleotide.

10. The method of claim 9, wherein the first stream further comprises the enzyme and the redox enzyme cofactor, and the method further comprises:
recovering the enzyme from the first stream after the first stream exits the channel, and
returning the enzyme to the first stream.

11. The method of claim 9, wherein the redox enzyme cofactor is reduced indirectly.

12. The method of claim 11, wherein the redox enzyme cofactor is NAD$^+$ or NADP$^+$, and the enzyme is formate dehydrogenase.

13. The method of claim 9, wherein a catalyst is fixed within the channel.

14. The method of claim 9, wherein the enzyme is formate dehydrogenase.

15. The method of claim 1, wherein the FADH$_2$ reduces NAD$^+$ or NADP$^+$, to form NADH or NADPH.

16. The method of claim 15, wherein the NADH or NADPH reacts with a substrate, to form a product and NAD$^+$ or NADP$^+$.

* * * * *

UNITED STATES PATENT AND TRADEMARK OFFICE
CERTIFICATE OF CORRECTION

PATENT NO. : 7,273,541 B2
APPLICATION NO. : 10/844058
DATED : September 25, 2007
INVENTOR(S) : Eric R. Choban et al.

It is certified that error appears in the above-identified patent and that said Letters Patent is hereby corrected as shown below:

On the title page, item [56]:
Col. 2, line 18 please delete "Checmistry" and insert --Chemistry--.

Col. 2, OTHER PUBLICATIONS please insert --Van der Donk, W.A., et al., Recent Developments in Puridine Nucleotide Regeneration," Current Opinion in Biotechnology, vol. 14, pp. 421-426, (2003).--.

Signed and Sealed this

Ninth Day of December, 2008

JON W. DUDAS
*Director of the United States Patent and Trademark Office*